(12) United States Patent
Jeon et al.

(10) Patent No.: US 8,268,489 B2
(45) Date of Patent: Sep. 18, 2012

(54) NON-AQUEOUS ELECTROLYTE SOLUTION FOR LITHIUM SECONDARY BATTERY AND LITHIUM SECONDARY BATTERY COMPRISING THE SAME

(75) Inventors: Jong-Ho Jeon, Daejeon (KR); Soo-Jin Kim, Daejeon (KR); Ho-Chun Lee, Daejeon (KR)

(73) Assignee: LG Chem, Ltd. (KR)

( * ) Notice: Subject to any disclaimer, the term of this patent is extended or adjusted under 35 U.S.C. 154(b) by 188 days.

(21) Appl. No.: 12/677,934

(22) Filed: Mar. 12, 2010

(65) Prior Publication Data

US 2011/0206999 A1 Aug. 25, 2011

Related U.S. Application Data

(63) Continuation of application No. PCT/KR2009/006687, filed on Nov. 13, 2009.

(30) Foreign Application Priority Data

Nov. 13, 2008 (KR) .................. 10-2008-0112724
Nov. 12, 2009 (KR) .................. 10-2009-0109232

(51) Int. Cl.
*H01M 10/052* (2010.01)
(52) U.S. Cl. ......... 429/338; 429/188; 429/302; 429/313
(58) Field of Classification Search .................. None
See application file for complete search history.

(56) References Cited

U.S. PATENT DOCUMENTS

| 6,416,905 | B1 | 7/2002 | Bronstert et al. |
| 6,872,493 | B2 * | 3/2005 | Yamada et al. ............ 429/313 |
| 2002/0160270 | A1 | 10/2002 | Bronstert et al. |
| 2005/0175897 | A1 * | 8/2005 | Jung et al. ................ 429/223 |
| 2007/0003824 | A1 * | 1/2007 | Jo et al. .................... 429/66 |
| 2007/0134557 | A1 * | 6/2007 | Park et al. ................ 429/326 |
| 2008/0233477 | A1 | 9/2008 | Takahashi et al. |

OTHER PUBLICATIONS

International Search Report, PCT/KR2009/006687, dated Jul. 2, 2010.

* cited by examiner

*Primary Examiner* — Ula C. Ruddock
*Assistant Examiner* — Alix Echelmeyer
(74) *Attorney, Agent, or Firm* — Lerner, David, Littenberg, Krumholz & Mentlik, LLP

(57) ABSTRACT

Disclosed are a non-aqueous electrolyte solution for a lithium secondary battery and a lithium secondary battery comprising the same. The non-aqueous electrolyte solution for a lithium secondary battery comprises a silicon-based compound represented by a specific chemical formula and having both a hydroxyl group and a hydrocarbon group having a carbon-carbon double bond. When it is applied to a lithium secondary battery, the non-aqueous electrolyte solution improves deterioration of cycle life characteristics occurring after repeated charge/discharge cycles and prevents swelling phenomena by suppressing a decomposition reaction of an electrolyte solution even when a battery in a fully charged state is stored at high temperature or is charged/discharged, thereby enhancing the life characteristics at high temperature.

15 Claims, No Drawings

NON-AQUEOUS ELECTROLYTE SOLUTION FOR LITHIUM SECONDARY BATTERY AND LITHIUM SECONDARY BATTERY COMPRISING THE SAME

CROSS-REFERENCE TO RELATED APPLICATIONS

The present application is a continuation of International Application No. PCT/KR2009/006687, filed on Nov. 13, 2009, which claims priority under 35 U.S.C. 119 to Korean Patent Application No. 10-2008-0112724 filed on Nov. 13, 2008 and Korean Patent Application No. 10-2009-0109232 filed on Nov. 12, 2009, all of which are hereby expressly incorporated by reference into the present application.

FIELD OF THE INVENTION

The present invention relates to a non-aqueous electrolyte solution for a lithium secondary battery and a lithium secondary battery comprising the same.

BACKGROUND OF THE INVENTION

Recently, interest in energy storage technologies is increasing day by day. As the energy storage technologies are extensively applied to mobile phones, camcorders and notebook computers, and further to electric vehicles, the demand for high energy densification is increasing in the field of batteries used as a power source of such electronic appliances. Lithium secondary batteries are the most suitable to meet the demand, and thus, their study is being made actively at present.

Among the currently available secondary batteries, lithium secondary batteries developed in the early 1990's comprise an anode of a carbon material capable of intercalating and disintercalating lithium ions, a cathode of lithium containing oxide and a non-aqueous electrolyte solution having a proper amount of lithium salt dissolved in a mixed organic solvent.

The lithium secondary batteries generally have an average discharge voltage between about 3.6V to about 3.7V. The lithium secondary batteries advantageously have a higher discharge voltage than alkali batteries, nickel-cadmium batteries and so on. To exhibit such a high operating voltage, it needs an electrolyte solution composition which is electrochemically stable in a charge/discharge voltage range between 0 to 4.2V. For this purpose, an electrolyte solution uses, as a solvent, a mixed solvent in which a cyclic carbonate compound such as ethylene carbonate, propylene carbonate, etc. is properly mixed with a linear carbonate compound such as dimethyl carbonate, ethylmethyl carbonate, diethyl carbonate, etc. And, the electrolyte solution generally uses, as a solute, a lithium salt including $LiPF_6$, $LiBF_4$, $LiClO_4$ and so on. These lithium salts serve as a source of lithium ions to enable operation of lithium secondary batteries.

At the initial charge of lithium secondary batteries, lithium ions emitted from a cathode active material such as lithium metal oxide transfer to an anode active material such as graphite, and intercalate into layers of the anode active material. At this time, because lithium has strong reactivity, an electrolyte solution reacts with carbon of the anode active material, such as graphite, to produce a compound such as $Li_2CO_3$, $Li_2O$, $LiOH$ and so on. These compounds form a so-called solid electrolyte interface (SEI) film on the surface of the anode active material such as graphite.

The SEI film acts as an ion tunnel, and enables only lithium ions to pass therethrough. Such ion tunnel effect of the SEI film prevents structural destruction of an anode that may be resulted from intercalation of molecules of an organic solvent having a high molecular weight into layers of the anode active material while migrating with lithium ions in the electrolyte solution. As a result, it prevents a contact between the electrolyte solution and the anode active material, and consequently reduces decomposition of the electrolyte solution. And, it can reversibly maintain an amount of lithium ions in the electrolyte solution, resulting in stable charge/discharge.

However, a thin-film prismatic battery may swell in thickness during charge due to CO, CO2, CH4, C2H6, etc that is generated by decomposition of a carbonate-based organic solvent occurring when an SEI film is formed as mentioned above. Furthermore, when a battery is left at a high temperature in a fully charged state, the SEI film may be slowly broken down due to increased electrochemical energy and thermal energy over time. It induces continuous side reactions between the exposed surface of an anode and a surrounding electrolyte solution, and consequently gas is continuously generated. The gas increases the inner pressure of the battery. As a result, the battery, particularly for example, a prismatic battery and a pouch-shaped battery have the increased thickness, which may cause performance problems to electronics such as mobile phones, notebook computers and so on. That is, stability at high temperature is lowered. Because a typical lithium secondary battery contains a great amount of ethylene carbonate, the lithium secondary battery is more vulnerable to the above-mentioned inner pressure increase problem caused by an unstable SEI film. In order to solve these problems, suggestion has been made to add an additive to a carbonate-based organic solvent so as to change the aspect of reactions occurring when an SEI film is formed. However, when a certain compound is added to an electrolyte solution to improve the battery performance, the characteristics of the battery are improved in some aspects, but may be deteriorated in some aspects.

SUMMARY OF THE INVENTION

The present invention is designed to solve the conventional problems, and therefore, it is an object of the present invention to provide a non-aqueous electrolyte solution for a lithium secondary battery which enhances the cycle life characteristics (charge/discharge cycles) of a battery and prevents swelling phenomena by suppressing a decomposition reaction of an electrolyte solution even when a battery in a fully charged state is stored at high temperature or is charged/discharged, and a lithium secondary battery comprising the same.

In order to accomplish the above object, the present invention provides a non-aqueous electrolyte solution for a lithium secondary battery comprising a lithium salt, a carbonate-based organic solvent, and a silicon-based compound represented by the following chemical formula 1:

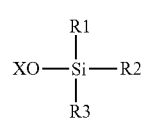

Chemical formula 1 where X is a hydrogen atom, and each of R1, R2 and R3 is a hydrogen atom or a hydrocarbon group having 1 to 10 carbon atoms, independently. At least one of R1, R2 and R3 has a carbon-carbon double bond. Preferably, at least one of R1, R2 and R3 is a vinyl group or an allyl group.

Preferably, the silicon-based compound is any one selected from the group consisting of dimethyl vinyl silanol, methylethyl vinyl silanol, methylpropyl vinyl silanol, methylbutyl vinyl silanol, methyl cyclohexyl vinyl silanol, methyl phenyl vinyl silanol, methyl benzyl vinyl silanol, diethyl vinyl silanol, ethylpropyl vinyl silanol, ethylbutyl vinyl silanol, ethyl cyclohexyl vinyl silanol, ethyl phenyl vinyl silanol, ethyl benzyl vinyl silanol, dipropyl vinyl silanol, propylbutyl vinyl silanol, propyl cyclohexyl vinyl silanol, propyl phenyl vinyl silanol, propyl benzyl vinyl silanol, dibutyl vinyl silanol, butyl cyclohexyl vinyl silanol, butyl phenyl vinyl silanol, butyl benzyl vinyl silanol, dicyclohexyl vinyl silanol, cyclohexyl phenyl vinyl silanol, cyclohexyl benzyl vinyl silanol, phenyl benzyl vinyl silanol, diphenyl vinyl silanol, dibenzyl vinyl silanol, dimethyl allyl silanol, methylethyl allyl silanol, methylpropyl allyl silanol, methyl butyl allyl silanol, methyl cyclohexyl allyl silanol, methyl phenyl allyl silanol, methyl benzyl allyl silanol, diethyl allyl silanol, ethylpropyl allyl silanol, ethylbutyl allyl silanol, ethyl cyclohexyl allyl silanol, ethyl phenyl allyl silanol, ethyl benzyl allyl silanol, dipropyl allyl silanol, propylbutyl allyl silanol, propyl cyclohexyl allyl silanol, propyl phenyl allyl silanol, propyl benzyl allyl silanol, dibutyl allyl silanol, butyl cyclohexyl allyl silanol, butyl phenyl allyl silanol, butyl benzyl allyl silanol, dicyclohexyl allyl silanol, cyclohexyl phenyl allyl silanol, cyclohexyl benzyl allyl silanol, phenyl benzyl allyl silanol, diphenyl allyl silanol and dibenzyl allyl silanol, or mixtures thereof.

In the non-aqueous electrolyte solution of the present invention, the carbonate-based organic solvent may be a cyclic carbonate compound, a linear carbonate compound or mixtures thereof, and may further include a linear ester compound. Preferably, the carbonate-based organic solvent is a mixture of a cyclic carbonate compound represented by the following chemical formula 2 and a linear carbonate compound represented by the following chemical formula 3, and may further include a cyclic carbonate compound represented by the following chemical formula 4 according to necessity.

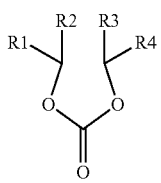

Chemical formula 2 where each of R1 to R4 is any one selected from the group consisting of a hydrogen atom, fluorine, and an alkyl group having 1 to 4 carbon atoms, independently.

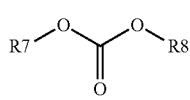

Chemical formula 3 where each of R7 and R8 is an alkyl group having 1 to 4 carbon atoms, independently, and at least one hydrogen atom may be optionally substituted for fluorine in the alkyl group.

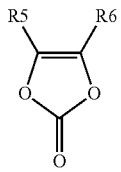

Chemical formula 4 where each of R5 and R6 is a hydrogen atom or an alkyl group having 1 to 4 carbon atoms, independently.

And, in the non-aqueous electrolyte solution of the present invention, the carbonate-based organic solvent includes a cyclic carbonate compound represented by the following chemical formula 2, and preferably the non-aqueous electrolyte solution further comprises a linear ester compound represented by the following chemical formula 5.

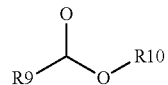

Chemical formula 5 where each of R9 and R10 is an alkyl group having 1 to 4 carbon atoms, independently, and at least one hydrogen atom may be optionally substituted for fluorine in the alkyl group.

The above-mentioned non-aqueous electrolyte solution for a lithium secondary battery is usefully applied to a typical lithium secondary battery comprising an anode and a cathode.

In the lithium secondary battery of the present invention, the cathode is preferably made of lithium cobalt oxide, lithium nickel-based oxide or mixtures thereof, and the lithium nickel-based oxide is more preferably $Li_{1-x}(Ni_a Co_b Mn_c)O_2 (-0.1 \leq x \leq 0.1, 0<a<1, 0<b<1, 0<c<1, a+b+c=1)$.

DETAILED DESCRIPTION

The non-aqueous electrolyte solution for a lithium secondary battery according to the present invention can improve deterioration of cycle life characteristics (charge/discharge cycles) of the lithium secondary battery and prevent swelling phenomena by suppressing a decomposition reaction of an electrolyte solution even when a battery in a fully charged state is stored at high temperature or is charged/discharged, thereby enhancing the life characteristics at high temperature.

These effects become prominent when lithium nickel-based oxide is used as a cathode.

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A non-aqueous electrolyte solution for a lithium secondary battery according to the present invention comprising a lithium salt and a carbonate-based organic solvent further comprises a silicon-based compound represented by the following chemical formula 1:

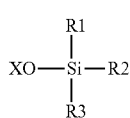

Chemical formula 1 where X is a hydrogen atom, and each of R1, R2 and R3 is a hydrogen atom or a hydrocarbon group having 1 to 10 carbon atoms, independently. At least one of R1, R2 and R3 has a carbon-carbon double bond. Preferably, at least one of R1, R2 and R3 is a vinyl group or an allyl group.

The silicon-based compound represented by the above chemical formula 1 has both a hydroxyl group and a hydrocarbon group having a carbon-carbon double bond. At the initial charge of a battery, the functional group having a carbon-carbon double bond in the silicon-based compound enables an SEI film to form on the surface of an anode through a reduction reaction with the anode earlier than the organic solvent. The hydroxyl group of the silicon-based compound reacts with hydrofluoric acid generated from the electrolyte solution, which is called a dehydration reaction, resulting in a stable compound. Accordingly, when the non-aqueous electrolyte solution comprising the silicon-based compound of the present invention is applied to a lithium secondary battery, it can improve deterioration of cycle life characteristics (charge/discharge cycles), and prevent swelling phenomena by suppressing a decomposition reaction of an electrolyte solution even when a battery in a fully charged state is stored at high temperature or is charged/discharged, thereby enhancing the life characteristics at high temperature.

Preferably, the content of the silicon-based compound represented by the above chemical formula 1 is 0.1 to 12 parts by weight per 100 parts by weight of the non-aqueous electrolyte solution. If the content of the silicon-based compound is less than 0.1 parts by weight, it is difficult to expect the effects of the present invention due to insufficient SEI (Solid-Electrolyte Interface) formed at an electrode. If the content of the silicon-based compound exceeds 12 parts by weight, it may result in reduced effects of the present invention due to the increased viscosity of a resulting non-aqueous electrolyte solution and the increased resistance of the formed SEI film.

The silicon-based compound of the chemical formula 1 may be any one selected from the group consisting of dimethyl vinyl silanol, methylethyl vinyl silanol, methylpropyl vinyl silanol, methylbutyl vinyl silanol, methyl cyclohexyl vinyl silanol, methyl phenyl vinyl silanol, methyl benzyl vinyl silanol, diethyl vinyl silanol, ethylpropyl vinyl silanol, ethylbutyl vinyl silanol, ethyl cyclohexyl vinyl silanol, ethyl phenyl vinyl silanol, ethyl benzyl vinyl silanol, dipropyl vinyl silanol, propylbutyl vinyl silanol, propyl cyclohexyl vinyl silanol, propyl phenyl vinyl silanol, propyl benzyl vinyl silanol, dibutyl vinyl silanol, butyl cyclohexyl vinyl silanol, butyl phenyl vinyl silanol, butyl benzyl vinyl silanol, dicyclohexyl vinyl silanol, cyclohexyl phenyl vinyl silanol, cyclohexyl benzyl vinyl silanol, phenyl benzyl vinyl silanol, diphenyl vinyl silanol, dibenzyl vinyl silanol, dimethyl allyl silanol, methylethyl allyl silanol, methylpropyl allyl silanol, methyl butyl allyl silanol, methyl cyclohexyl allyl silanol, methyl phenyl allyl silanol, methyl benzyl allyl silanol, diethyl allyl silanol, ethylpropyl allyl silanol, ethylbutyl allyl silanol, ethyl cyclohexyl allyl silanol, ethyl phenyl allyl silanol, ethyl benzyl allyl silanol, dipropyl allyl silanol, propylbutyl allyl silanol, propyl cyclohexyl allyl silanol, propyl phenyl allyl silanol, propyl benzyl allyl silanol, dibutyl allyl silanol, butyl cyclohexyl allyl silanol, butyl phenyl allyl silanol, butyl benzyl allyl silanol, dicyclohexyl allyl silanol, cyclohexyl phenyl allyl silanol, cyclohexyl benzyl allyl silanol, phenyl benzyl allyl silanol, diphenyl allyl silanol and dibenzyl allyl silanol, or mixtures thereof.

In the non-aqueous electrolyte solution of the present invention, the carbonate-based organic solvent may be a typical carbonate-based organic solvent. For example, the carbonate-based organic compound may be a cyclic carbonate compound, a linear carbonate compound or mixtures thereof, and may further include a linear ester compound. Preferably, the carbonate-based organic solvent is a mixture of a cyclic carbonate compound represented by the following chemical formula 2 and a linear carbonate compound represented by the following chemical formula 3, and may further include a cyclic carbonate compound represented by the following chemical formula 4 according to necessity.

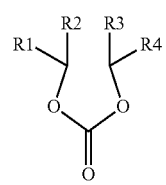

Chemical formula 2 where each of R1 to R4 is any one selected from the group consisting of a hydrogen atom, fluorine, and an alkyl group having 1 to 4 carbon atoms, independently.

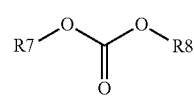

Chemical formula 3 where each of R7 and R8 is an alkyl group having 1 to 4 carbon atoms, independently, and at least one hydrogen atom may be optionally substituted for fluorine in the alkyl group.

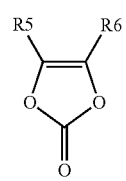

Chemical formula 4 where each of R5 and R6 is a hydrogen atom or an alkyl group having 1 to 4 carbon atoms, independently.

And, in the non-aqueous electrolyte solution of the present invention, preferably the carbonate-based organic solvent includes a cyclic carbonate compound represented by the above chemical formula 2, and preferably the non-aqueous electrolyte solution further comprises a linear ester compound represented by the following chemical formula 5.

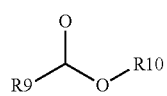

Chemical formula 5 where each of R9 and R10 is an alkyl group having 1 to 4 carbon atoms, independently, and at least one hydrogen atom may be optionally substituted for fluorine in the alkyl group.

The cyclic carbonate compound favorably dissociates a lithium salt in an electrolyte, and consequently contributes to improvement in charge/discharge capacity of a battery. The carbonate compound represented by the chemical formula 2 may be ethylene carbonate, propylene carbonate, fluoroethylene carbonate, butylene carbonate or mixtures thereof. In particular, ethylene carbonate or a mixture of ethylene carbonate and propylene carbonate has a high dielectric constant, and thus, they dissociate a lithium salt in an electrolyte more favorably. In the case of a mixture of ethylene carbonate and propylene carbonate, a preferred mixing ratio (by volume) of the propylene carbonate is ¼ to 1 of the ethylene carbonate.

The linear carbonate compound represented by the chemical formula 3 contributes to improvement in charge/discharge efficiency of a lithium secondary battery and optimum battery performance. Such compound may be dimethyl carbonate, diethyl carbonate, ethylmethyl carbonate, methylpropyl carbonate or mixtures thereof. The cyclic carbonate compound represented by the chemical formula 4 may be vinylene carbonate.

The linear ester compound represented by the chemical formula 5 is a low viscosity and low melting point organic solvent having a low freezing point, a relatively high boiling point and excellent low temperature characteristics. And, the linear ester compound has a relatively low reactivity with an anode of a carbon material. When such linear ester compound is mixed with the cyclic carbonate compound, it contributes to improvement in discharge characteristics at low temperature and life of a lithium secondary battery. That is, the linear ester compound properly coordinates lithium ions, and thus exhibits high ionic conductivity at room temperature and low temperature, which allows improvement in low temperature discharge characteristics and high rate discharge characteristics of a battery. And, the linear ester compound has an oxidation voltage of 4.5V or higher, which is one of intrinsic characteristics of a solvent, and provides a resistance against a decomposition reaction at a cathode during charge, resulting in longer life of a battery. Furthermore, when the linear ester compound is added, wettability of an electrode to an electrolyte solution gets better than a case where solely a carbonate-based solvent is used as a non-aqueous electrolyte solution, and thus, it prevents lithium dendrites from forming on the surface of the electrode and consequently contributes to improvement in safety of a battery. Such linear ester compound of the chemical formula 5 may be methyl acetate, ethyl acetate, propyl acetate, methyl propionate, ethyl propionate or propyl propionate, and more preferably, ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, 2,2,2-trifluoroethyl 3,3,3-trifluoropropanoate or mixtures thereof.

The lithium salt contained as an electrolyte in the non-aqueous electrolyte solution is not limited to a specific type of lithium salt, but includes, without limitation, typical ones used in a non-aqueous electrolyte solution for a lithium secondary battery. Representatively, the lithium salt may be $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and so on. To improve the safety of a battery, it is obvious that the non-aqueous electrolyte solution of the present invention may further comprise vinyl ethylene carbonate, succinonitrile, cyclohexyl benzene, biphenyl, 1,3-dioxolane-2-onylmethyl allyl sulfonate and so on, without departing from the scope and spirit of the present invention.

The above-mentioned non-aqueous electrolyte solution is used as a non-aqueous electrolyte solution for a typical lithium secondary battery comprising an anode, a cathode and a non-aqueous electrolyte solution.

Generally, a carbon material capable of intercalating and disintercalating lithium ions is used as an anode, and a lithium-containing oxide material is used as a cathode.

The carbon material capable of intercalating and disintercalating lithium ions may include a low crystallinity carbon and a high crystallinity carbon. Representatively, the low crystallinity carbon includes soft carbon and hard carbon, and the high crystallinity carbon includes high-temperature plasticity carbon such as natural carbon, Kish graphite, pyrolytic carbon, mesophase pitch based carbon fiber, meso-carbon microbeads, Mesophase pitches, petroleum or coal tar pitch derived cokes and so on. At this time, the anode may include a binder, and the binder may include various kinds of binder polymers such as vinylidenefluoride-hexafluoropropylene copolymer (PVDF-co-HFP), polyvinylidenefluoride, polyacrylonitrile, polymethylmethacrylate and so on.

Preferably, the cathode of lithium-containing oxide may be lithium-containing transition metal oxide, more preferably lithium cobalt oxide ($LiCoO_2$), lithium nickel-based oxide or mixtures thereof. Particularly, in the non-aqueous electrolyte solution of the present invention, the effects of the present invention become prominent when lithium nickel-based oxide is used as a cathode. That is, in the case that lithium nickel-based oxide is used as a cathode, it may implement a high capacity battery. In this case, however, it needs to solve the problems such as deterioration of cycle life characteristics (charge/discharge cycles) and swelling phenomena of a battery. To solve the problems, the non-aqueous electrolyte solution of the present invention comprising the silicon-based compound represented by the chemical formula 1 is used in a lithium secondary battery comprising a cathode of lithium nickel-based oxide.

As the cathode, lithium nickel-based oxide may be $LiNiO_2$, $Li_{1-x}(Ni_aCo_bMn_c)O_2$, wherein $-0.1 \leq x \leq 0.1$, $0<a<1$, $0<b<1$, $0<c<1$, and $a+b+c=1$; $LiNi_{1-y}Co_yO_2$, wherein $0 \leq y<1$; $LiNi_{1-y}Mn_yO_2$, wherein $0 \leq y<1$; $Li(Ni_aCo_bMn_c)O_4$, wherein $0<a<2$, $0<b<2$, $0<c<2$, and $a+b+c=2$; $LiMn_{2-z}Ni_zO_4$, wherein $0<z<2$; or mixtures thereof, preferably $Li_{1-x}(Ni_aCo_bMn_c)O_2$, wherein $-0.1 \leq x \leq 0.1$, $0<a<1$, $0<b<1$, $0<c<1$, and $a+b+c=1$; more preferably $Li_{1-x}(Ni_aCo_bMn_c)O_2$, wherein $-0.1 \leq x \leq 0.1$, $0.5 \leq a \leq 0.8$, $0.1 \leq b \leq 0.2$, $0.1 \leq c \leq 0.3$, and $a+b+c=1$.

An electrode of a lithium secondary battery according to the present invention may be manufactured by a typical method, for example, in such a way that electrode active material particles and a binder polymer are added to a solvent with a conductive material and a dispersant according to necessity to prepare a slurry, and the slurry is applied onto a current collector, followed by compression and drying. At this time, it is obvious that a cathode may be easily manufactured by an ordinary person skilled in the art under the control of the thickness of a cathode active material layer formed on the current collector, an amount of the binder polymer, procedural conditions and so on.

Generally, a separator is interposed between the cathode and the anode, and may be a typical porous polymer film singularly or in multiples that is made of, for example, a polyolefin-based polymer such as ethylene polymer, propylene polymer, ethylene-butene copolymer, ethylene-hexene copolymer, ethylene-methacrylate copolymer and so on. In addition, the separator may be a non-woven fabric made of, for example, a high melting point glass fiber, polyethyleneterephthalate and so on, however the present invention is not limited in this regard.

A case of the lithium secondary battery according to the present invention may have various shapes including, without limitation, a cylindrical shape, a prismatic shape, a pouch shape, a coin shape and so on.

EXAMPLES

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Example 1

1M $LiPF_6$ was added to a mixed organic solvent having ethylene carbonate (EC):ethylmethyl carbonate (EMC)=1:2 (v:v), to prepare a non-aqueous electrolyte solution. 0.05 parts by weight of dimethyl vinyl silanol was added per 100 parts by weight of the non-aqueous electrolyte solution.

The resulting non-aqueous electrolyte solution was injected into a pouch-shaped battery comprising a cathode of $LiCoO_2$ and an anode of artificial graphite.

Example 2

A pouch-shaped battery was manufactured in the same way as example 1 except that the content of dimethylvinyl silanol was 0.1 parts by weight per 100 parts by weight of the non-aqueous electrolyte solution.

Example 3

A pouch-shaped battery was manufactured in the same way as example 1 except that the content of dimethylvinyl silanol was 0.5 parts by weight per 100 parts by weight of the non-aqueous electrolyte solution.

Example 4

A pouch-shaped battery was manufactured in the same way as example 1 except that the content of dimethylvinyl silanol was 1.0 parts by weight per 100 parts by weight of the non-aqueous electrolyte solution.

Example 5

A pouch-shaped battery was manufactured in the same way as example 1 except that the content of dimethylvinyl silanol was 5.0 parts by weight per 100 parts by weight of the non-aqueous electrolyte solution.

Example 6

A pouch-shaped battery was manufactured in the same way as example 1 except that the content of dimethylvinyl silanol was 8.0 parts by weight per 100 parts by weight of the non-aqueous electrolyte solution.

Example 7

A pouch-shaped battery was manufactured in the same way as example 1 except that the content of dimethylvinyl silanol was 12.0 parts by weight per 100 parts by weight of the non-aqueous electrolyte solution.

Example 8

A pouch-shaped battery was manufactured in the same way as example 1 except that 1.0 parts by weight of vinylene carbonate (VC) was further included per 100 parts by weight of the non-aqueous electrolyte solution.

Example 9

A pouch-shaped battery was manufactured in the same way as example 2 except that 1.0 parts by weight of vinylene carbonate (VC) was further included per 100 parts by weight of the non-aqueous electrolyte solution.

Example 10

A pouch-shaped battery was manufactured in the same way as example 3 except that 1.0 parts by weight of vinylene carbonate (VC) was further included per 100 parts by weight of the non-aqueous electrolyte solution.

Example 11

A pouch-shaped battery was manufactured in the same way as example 4 except that 1.0 parts by weight of vinylene carbonate (VC) was further included per 100 parts by weight of the non-aqueous electrolyte solution.

Example 12

A pouch-shaped battery was manufactured in the same way as example 5 except that 1.0 parts by weight of vinylene carbonate (VC) was further included per 100 parts by weight of the non-aqueous electrolyte solution.

Example 13

A pouch-shaped battery was manufactured in the same way as example 6 except that 1.0 parts by weight of vinylene carbonate (VC) was further included per 100 parts by weight of the non-aqueous electrolyte solution.

Example 14

A pouch-shaped battery was manufactured in the same way as example 7 except that 1.0 parts by weight of vinylene carbonate (VC) was further included per 100 parts by weight of the non-aqueous electrolyte solution.

Example 15

A pouch-shaped battery was manufactured in the same way as example 1 except that 1M $LiPF_6$ was added to a mixed organic solvent having ethylene carbonate (EC):ethyl propionate (EP)=1:2(v:v) to prepare a non-aqueous electrolyte solution.

Example 16

A pouch-shaped battery was manufactured in the same way as example 2 except that 1M $LiPF_6$ was added to a mixed organic solvent having ethylene carbonate (EC):ethyl propionate (EP)=1:2(v:v) to prepare a non-aqueous electrolyte solution.

Example 17

A pouch-shaped battery was manufactured in the same way as example 3 except that 1M $LiPF_6$ was added to a mixed organic solvent having ethylene carbonate (EC):ethyl propionate (EP)=1:2(v:v) to prepare a non-aqueous electrolyte solution.

Example 18

A pouch-shaped battery was manufactured in the same way as example 4 except that 1M $LiPF_6$ was added to a mixed organic solvent having ethylene carbonate (EC):ethyl propionate (EP)=1:2(v:v) to prepare a non-aqueous electrolyte solution.

Example 19

A pouch-shaped battery was manufactured in the same way as example 5 except that 1M $LiPF_6$ was added to a mixed organic solvent having ethylene carbonate (EC):ethyl propionate (EP)=1:2(v:v) to prepare a non-aqueous electrolyte solution.

Example 20

A pouch-shaped battery was manufactured in the same way as example 6 except that 1M $LiPF_6$ was added to a mixed organic solvent having ethylene carbonate (EC):ethyl propionate (EP)=1:2(v:v) to prepare a non-aqueous electrolyte solution.

Example 21

A pouch-shaped battery was manufactured in the same way as example 7 except that 1M $LiPF_6$ was added to a mixed organic solvent having ethylene carbonate (EC):ethyl propionate (EP)=1:2(v:v) to prepare a non-aqueous electrolyte solution.

Example 22

A pouch-shaped battery was manufactured in the same way as example 8 except that 1M $LiPF_6$ was added to a mixed organic solvent having ethylene carbonate (EC):ethyl propionate (EP)=1:2(v:v) to prepare a non-aqueous electrolyte solution.

Example 23

A pouch-shaped battery was manufactured in the same way as example 9 except that 1M $LiPF_6$ was added to a mixed organic solvent having ethylene carbonate (EC):ethyl propionate (EP)=1:2(v:v) to prepare a non-aqueous electrolyte solution.

Example 24

A pouch-shaped battery was manufactured in the same way as example 10 except that 1M $LiPF_6$ was added to a mixed organic solvent having ethylene carbonate (EC):ethyl propionate (EP)=1:2(v:v) to prepare a non-aqueous electrolyte solution.

Example 25

A pouch-shaped battery was manufactured in the same way as example 11 except that 1M $LiPF_6$ was added to a mixed organic solvent having ethylene carbonate (EC):ethyl propionate (EP)=1:2(v:v) to prepare a non-aqueous electrolyte solution.

Example 26

A pouch-shaped battery was manufactured in the same way as example 12 except that 1M $LiPF_6$ was added to a mixed organic solvent having ethylene carbonate (EC):ethyl propionate (EP)=1:2(v:v) to prepare a non-aqueous electrolyte solution.

Example 27

A pouch-shaped battery was manufactured in the same way as example 13 except that 1M $LiPF_6$ was added to a mixed organic solvent having ethylene carbonate (EC):ethyl propionate (EP)=1:2(v:v) to prepare a non-aqueous electrolyte solution.

Example 28

A pouch-shaped battery was manufactured in the same way as example 14 except that 1M $LiPF_6$ was added to a mixed organic solvent having ethylene carbonate (EC):ethyl propionate (EP)=1:2(v:v) to prepare a non-aqueous electrolyte solution.

Example 29

A pouch-shaped battery was manufactured in the same way as example 4 except that solely $LiNi_{0.5}Mn_{0.3}Co_{0.2}O_2$ was used as a cathode.

Example 30

A pouch-shaped battery was manufactured in the same way as example 18 except that solely $LiNi_{0.5}Mn_{0.3}Co_{0.2}O_2$ was used as a cathode.

Comparative Example 1

A pouch-shaped battery was manufactured in the same way as example 1 except that dimethyl vinyl silanol was not added.

Comparative Example 2

A pouch-shaped battery was manufactured in the same way as example 8 except that dimethyl vinyl silanol was not added.

Comparative Example 3

A pouch-shaped battery was manufactured in the same way as example 15 except that dimethyl vinyl silanol was not added.

Comparative Example 4

A pouch-shaped battery was manufactured in the same way as example 22 except that dimethyl vinyl silanol was not added.

Comparative Example 5

A pouch-shaped battery was manufactured in the same way as comparative example 1 except that 1.0 parts by weight of tetramethylsilanol was included per 100 parts by weight of the non-aqueous electrolyte solution.

Comparative Example 6

A pouch-shaped battery was manufactured in the same way as comparative example 1 except that solely $LiNi_{0.5}Mn_{0.3}Co_{0.2}O_2$ was used as a cathode.

Comparative Example 7

A pouch-shaped battery was manufactured in the same way as comparative example 3 except that solely $LiNi_{0.5}Mn_{0.3}Co_{0.2}O_2$ was used as a cathode.

Method for evaluating initial performance and life of battery

After injection of the electrolyte solution, the pouch-shaped batteries manufactured according to examples and comparative examples were aged at room temperature for 2 days and then charged at 0.2C-rate for 50 minutes. Next, the batteries were degassed and resealed, and then charged at 0.2C under constant current constant voltage conditions at room temperature until the voltage becomes 4.2V, and discharged at 0.2C under constant current conditions until the voltage becomes 3.0V. This process is called initial charge/discharge. At this time, a ratio of charge capacity to discharge capacity is called initial efficiency. After the initial charge/discharge, charge/discharge was carried out 400 times at 1.0C-rate in the same voltage range. A capacity retention ratio after 400 cycles was evaluated and the results are shown in the following table 1.

Method for Evaluating Changes in Thickness After Storage at High Temperature

After initial charge/discharge was carried out on the pouch-shaped batteries manufactured according to examples and comparative examples as mentioned above, charge/discharge was carried out 4 times at 1.0C-rate in the same voltage range. Next, the batteries were charged at 1.0C-rate until the voltage becomes 4.2V, and left at temperature increased from room temperature to 90° C. throughout 1 hour and maintained at 90° C. for 4 hours. The thickness was measured at room temperature and at high temperature, respectively, and the changes (increment) in thickness were shown in the following table 1.

TABLE 1

|  | Initial efficiency (%) | Capacity retention after 400 cycles (%) | Thickness change at high temperature (mm) |
|---|---|---|---|
| Example 1 | 90.1 | 76.7 | 2.72 |
| Example 2 | 90.2 | 80.3 | 1.98 |
| Example 3 | 90.1 | 83.3 | 1.58 |
| Example 4 | 90.2 | 85.6 | 0.93 |
| Example 5 | 90.0 | 82.2 | 0.57 |
| Example 6 | 90.0 | 80.1 | 0.42 |
| Example 7 | 89.6 | 70.3 | 0.33 |
| Example 8 | 90.3 | 79.5 | 2.55 |
| Example 9 | 90.3 | 81.2 | 1.81 |
| Example 10 | 90.4 | 83.4 | 1.49 |
| Example 11 | 90.3 | 85.7 | 0.88 |
| Example 12 | 90.1 | 82.0 | 0.55 |
| Example 13 | 90.0 | 80.0 | 0.40 |
| Example 14 | 89.4 | 71.5 | 0.32 |
| Example 15 | 90.1 | 78.8 | 2.60 |
| Example 16 | 90.3 | 80.6 | 1.74 |
| Example 17 | 90.3 | 84.0 | 1.35 |
| Example 18 | 90.3 | 86.5 | 0.87 |
| Example 19 | 90.2 | 84.1 | 0.51 |
| Example 20 | 90.0 | 81.7 | 0.36 |

TABLE 1-continued

|  | Initial efficiency (%) | Capacity retention after 400 cycles (%) | Thickness change at high temperature (mm) |
|---|---|---|---|
| Example 21 | 89.7 | 74.3 | 0.26 |
| Example 22 | 90.5 | 79.9 | 2.53 |
| Example 23 | 90.5 | 82.4 | 1.52 |
| Example 24 | 90.6 | 85.6 | 1.22 |
| Example 25 | 90.5 | 86.6 | 0.79 |
| Example 26 | 90.6 | 84.8 | 0.50 |
| Example 27 | 90.3 | 82.0 | 0.33 |
| Example 28 | 90.0 | 75.5 | 0.27 |
| Example 29 | 89.3 | 85.3 | 1.49 |
| Example 30 | 89.8 | 85.7 | 1.38 |
| Comparative example 1 | 90.2 | 73.8 | 3.21 |
| Comparative example 2 | 90.1 | 78.6 | 3.05 |
| Comparative example 3 | 90.0 | 77.0 | 2.89 |
| Comparative example 4 | 90.4 | 79.3 | 2.74 |
| Comparative example 5 | 89.8 | 69.8 | 4.26 |
| Comparative example 6 | 83.1 | 62.5 | 4.15 |
| Comparative example 7 | 84.4 | 55.1 | 4.32 |

What is claimed is:

1. A non-aqueous electrolyte solution for a lithium secondary battery, comprising:
   a lithium salt;
   a carbonate-based organic solvent; and
   a silicon-based compound represented by the following chemical formula 1:

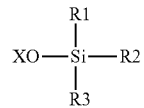

<Chemical formula 1> where X is a hydrogen atom, each of R1, R2 and R3 is a hydrogen atom or a hydrocarbon group having 1 to 10 carbon atoms, independently, and at least one of R1, R2 and R3 has a carbon-carbon double bond.

2. The non-aqueous electrolyte solution for a lithium secondary battery according to claim 1,
   wherein at least one of R1, R2 and R3 in the chemical formula 1 is a vinyl group or an allyl group.

3. The non-aqueous electrolyte solution for a lithium secondary battery according to claim 1,
   wherein the silicon-based compound is any one selected from the group consisting of dimethyl vinyl silanol, methylethyl vinyl silanol, methylpropyl vinyl silanol, methylbutyl vinyl silanol, methyl cyclohexyl vinyl silanol, methyl phenyl vinyl silanol, methyl benzyl vinyl silanol, diethyl vinyl silanol, ethylpropyl vinyl silanol, ethylbutyl vinyl silanol, ethyl cyclohexyl vinyl silanol, ethyl phenyl vinyl silanol, ethyl benzyl vinyl silanol, dipropyl vinyl silanol, propylbutyl vinyl silanol, propyl cyclohexyl vinyl silanol, propyl phenyl vinyl silanol, propyl benzyl vinyl silanol, dibutyl vinyl silanol, butyl cyclohexyl vinyl silanol, butyl phenyl vinyl silanol, butyl benzyl vinyl silanol, dicyclohexyl vinyl silanol, cyclohexyl phenyl vinyl silanol, cyclohexyl benzyl vinyl silanol, phenyl benzyl vinyl silanol, diphenyl vinyl silanol, dibenzyl vinyl silanol, dimethyl allyl silanol, methylethyl allyl silanol, methylpropyl allyl silanol, methyl butyl allyl silanol, methyl cyclohexyl allyl silanol, methyl phenyl allyl silanol, methyl benzyl allyl silanol, diethyl allyl silanol, ethylpropyl allyl silanol, ethylbutyl allyl silanol, ethyl cyclohexyl allyl silanol, ethyl phenyl allyl silanol, ethyl benzyl allyl silanol, dipropyl allyl silanol, propylbutyl allyl silanol, propyl cyclohexyl allyl silanol, propyl phenyl allyl silanol, propyl benzyl allyl silanol, dibutyl allyl silanol, butyl cyclohexyl allyl silanol, butyl phenyl allyl silanol, butyl benzyl allyl silanol, dicyclohexyl allyl silanol, cyclohexyl phenyl allyl silanol, cyclohexyl benzyl allyl silanol, phenyl benzyl allyl silanol, diphenyl allyl silanol, dibenzyl allyl silanol, and mixtures thereof.

4. The non-aqueous electrolyte solution for a lithium secondary battery according to claim 1,
wherein the amount of the silicon-based compound is from 0.1 to 12.0 parts by weight per 100 parts by weight of the non-aqueous electrolyte solution.

5. The non-aqueous electrolyte solution for a lithium secondary battery according to claim 1,
wherein the carbonate-based organic solvent is a mixture of a cyclic carbonate compound represented by the following chemical formula 2 and a linear carbonate compound represented by the following chemical formula 3:

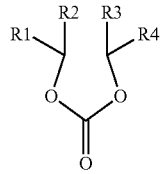

<Chemical formula 2> where each of R1 to R4 is any one selected from the group consisting of a hydrogen atom, fluorine, and an alkyl group having 1 to 4 carbon atoms, independently,

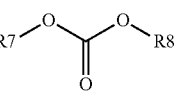

<Chemical formula 3> where each of R7 and R8 is an alkyl group having 1 to 4 carbon atoms, independently, and fluorine is optionally substituted for at least one hydrogen atom in the alkyl group.

6. The non-aqueous electrolyte solution for a lithium secondary battery according to claim 5,
wherein the cyclic carbonate compound represented by the chemical formula 2 is ethylene carbonate, and the linear carbonate compound represented by the chemical formula 3 is ethylmethyl carbonate.

7. The non-aqueous electrolyte solution for a lithium secondary battery according to claim 5,
wherein the carbonate-based organic solvent further comprises a cyclic carbonate compound represented by the following chemical formula 4:

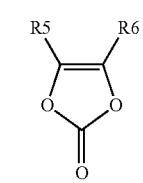

<Chemical formula 4> where each of R5 and R6 is a hydrogen atom or an alkyl group having 1 to 4 carbon atoms, independently.

8. The non-aqueous electrolyte solution for a lithium secondary battery according to claim 1,
wherein the carbonate-based organic solvent comprises a cyclic carbonate compound represented by the following chemical formula 2, and the non-aqueous electrolyte solution further comprises a linear ester compound represented by the following chemical formula 5:

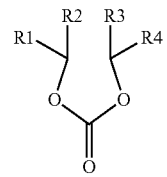

<Chemical formula 2> where each of R1 to R4 is any one selected from the group consisting of a hydrogen atom, fluorine, and an alkyl group having 1 to 4 carbon atoms, independently, <Chemical formula 5> where each of R9 and R10 is an alkyl group having 1 to 4 carbon atoms, independently, and fluorine is optionally substituted for at least one hydrogen atom in the alkyl group.

9. The non-aqueous electrolyte solution for a lithium secondary battery according to claim 8,
wherein the cyclic carbonate compound represented by the chemical formula 2 is ethylene carbonate, and the linear ester compound represented by the above chemical formula 5 is ethyl propionate.

10. The non-aqueous electrolyte solution for a lithium secondary battery according to claim 8,
wherein the carbonate-based organic solvent further comprises a cyclic carbonate compound represented by the following chemical formula 4:

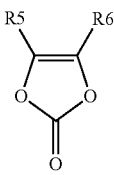

<Chemical formula 4> where each of R5 and R6 is a hydrogen atom or an alkyl group having 1 to 4 carbon atoms, independently.

11. A lithium secondary battery, comprising:
an anode;
a cathode; and
the non-aqueous electrolyte solution of claim 1.

12. The lithium secondary battery according to claim 11,
wherein the cathode is a lithium-containing oxide selected from the group consisting of lithium cobalt oxide, lithium nickel-based oxide and mixtures thereof.

13. The lithium secondary battery according to claim 12, wherein the lithium nickel-based oxide is any one selected from the group consisting of
LiNiO$_2$;
Li$_{1-x}$(Ni$_a$Co$_b$Mn$_c$)O$_2$, wherein $-0.1 \leq x \leq 0.1$, $0<a<1$, $0<b<1$, $0<c<1$, and a+b+c=1;
LiNi$_{1-y}$Co$_y$O$_2$, wherein $0 \leq y<1$;
LiNi$_{1-y}$Mn$_y$O$_2$, wherein $0 \leq y<1$;
Li(Ni$_a$Co$_b$Mn$_c$)O$_4$, wherein $0<a<2$, $0<b<2$, $0<c<2$, and a+b+c=2;
LiMn$_{2-z}$Ni$_z$O$_4$, wherein $0<z<2$; and mixtures thereof.

14. The lithium secondary battery according to claim 12, wherein the lithium nickel-based oxide is Li$_{1-x}$(Ni$_a$Co$_b$Mn$_c$)O$_2$, wherein $-0.1 \leq x \leq 0.1$, $0<a<1$, $0<b<1$, $0<c<1$, and a+b+c=1.

15. The lithium secondary battery according to claim 12, wherein the lithium nickel-based oxide is Li$_{1-x}$(Ni$_a$CO$_b$Mn$_c$)O$_2$, wherein $-0.1 \leq x \leq 0.1$, $0.5 \leq a \leq 0.8$, $0.1 \leq b \leq 0.2$, $0.1 \leq c \leq 0.3$, and a+b+c=1.

* * * * *